Nov. 22, 1938.    J. W. SCHIEBER    2,137,956
NONREFILLABLE ATTACHMENT
Filed Nov. 1, 1937    3 Sheets-Sheet 3
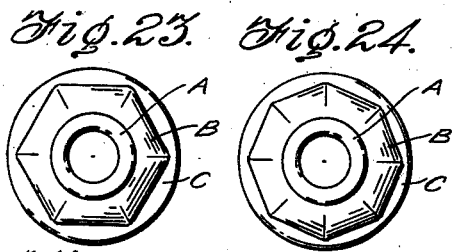
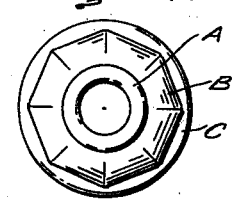
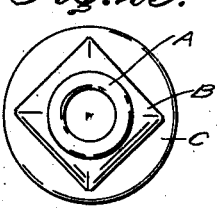
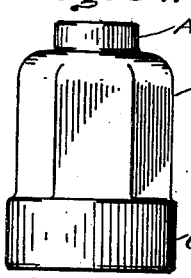
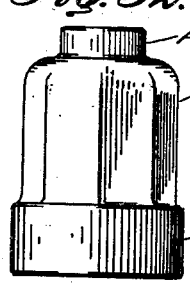
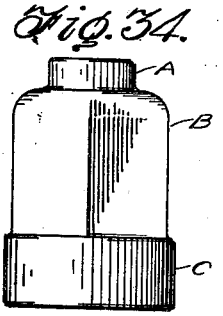
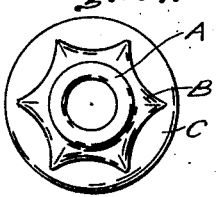
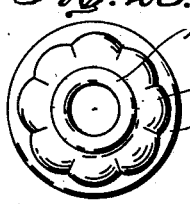
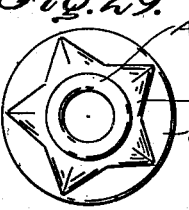
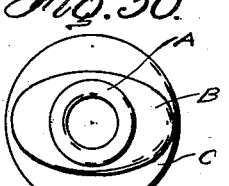
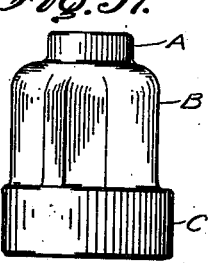
Inventor
JACOB W. SCHIEBER,
By Kimmel & Crowell,
Attorneys.

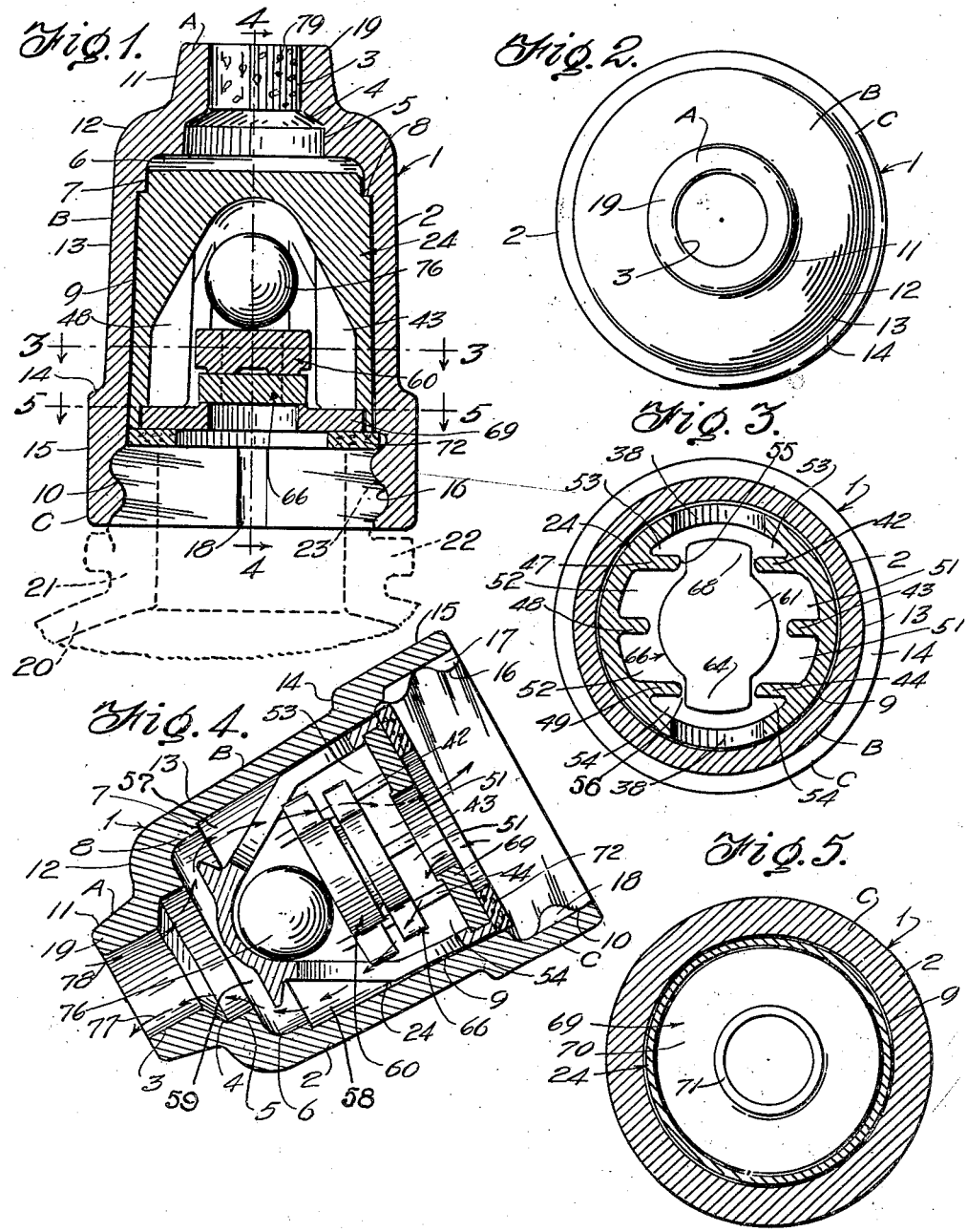

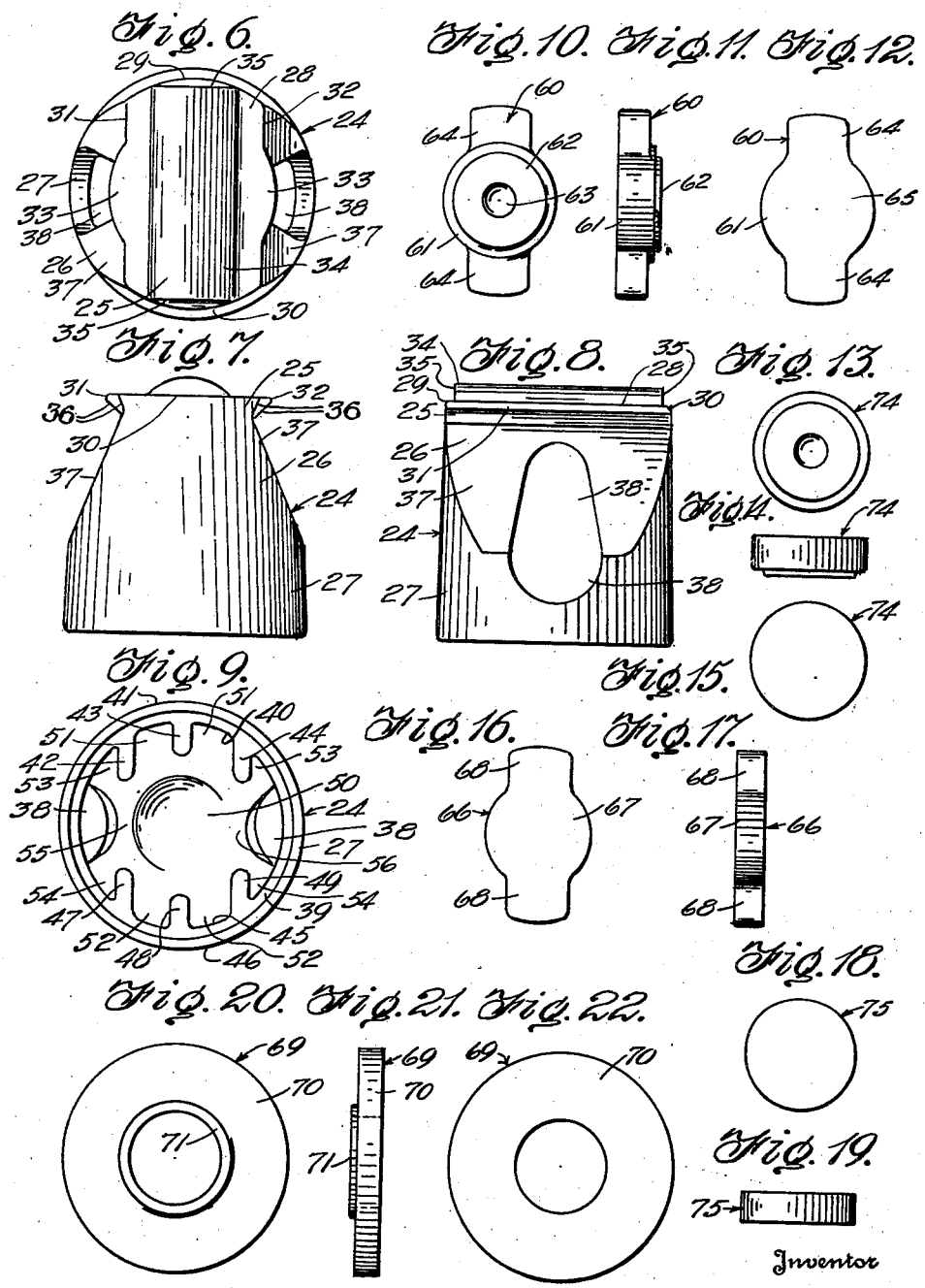

Patented Nov. 22, 1938

2,137,956

UNITED STATES PATENT OFFICE 2,137,956

NONREFILLABLE ATTACHMENT

Jacob W. Schieber, Scranton, Pa.

Application November 1, 1937, Serial No. 172,289

7 Claims. (Cl. 215—22)

This invention relates to a non-refillable attachment for bottles, jugs and containers, and is designed primarily for use in connection with bottles containing high grade liquors, wines, perfumes, etc., but it is to be understood that the attachment, in accordance with this invention, may be employed in connection with any type of container holding powders or pellets, for which it is found applicable.

The invention aims to provide, in a manner as hereinafter set forth, an attachment of the class referred to which, when in anchored relation with respect to the neck of a bottle, will prevent the surreptitious refilling of the bottle after the original contents of the latter have been discharged.

A further object of the invention is to provide, in a manner as hereinafter set forth, an attachment of the class referred to so constructed as to permit a greater volume of liquid to be discharged in a less period of time in comparison to attachments of the class to which this invention relates.

A further object of the invention is to provide, in a manner as hereinafter set forth, an attachment of the class referred to, including a pair of valvular elements having coacting means to cause them to bodily move in unison when the bottle is tilted for discharge whereby no interruption will be had to the flow.

A further object of the invention is to provide, in a manner as hereinafter set forth, an attachment of the class referred to including a pair of valvular elements controlling discharge and intake, one of said elements being non-buoyant and the other possessing a buoyant characteristic.

A further object of the invention is to provide, in a manner as hereinafter set forth, an attachment of the class referred to including a pair of controlling valve elements therefor, said elements having coacting means for releasably connecting them together and one possessing a non-buoyant characteristic and the other a buoyant characteristic and with the element possessing the buoyant characteristic capable of being disconnected from the other of the elements and seating to close the container when an attempt is made to refill the same.

The invention further aims to provide, in a manner as hereinafter set forth, a non-refillable attachment for bottles, jugs and containers which is simple in its construction and arrangement, strong, durable, compact, readily assembled, conveniently attached and sealed, in active position with respect to the bottle or container with which it is to be used, thoroughly efficient in its use, and inexpensive to manufacture.

To the above ends essentially and to others which may hereinafter appear, the invention consists of the novel construction, combination and arrangement of parts as will be more specifically referred to and illustrated in the accompanying drawings wherein is shown embodiments of the invention, but it is to be understood that changes, variations and modifications may be resorted to which fall within the scope of the invention as claimed.

In the drawings:

Figure 1 is a vertical sectional view of the attachment as installed with respect to the neck of a bottle, Figure 2 is a top plan view thereof, Figure 3 is a section on line 3—3, Figure 1, Figure 4 is a section on line 4—4, Figure 1 and with the attachment disposed in discharging position, Figure 5 is a section on line 5—5, Figure 1, Figure 6 is a top plan view of the combined housing and fluid conducting element, Figure 7 is an elevation looking towards one side thereof, Figure 8 is an elevation looking towards the other side of the structure shown in Figure 7, Figure 9 is an inverted plan view of the structure shown in Figure 6, Figure 10 is an inverted plan view, Figure 11 is a side elevation and Figure 12 is a top plan view of the non-buoyant valvular element, Figure 13 is an inverted plan view, Figure 14 is an edge view and Figure 15 is a top plan view of a modified form of the non-buoyant valvular element, Figure 16 is a plan view, Figure 17 is an edge view of the buoyant valvular element, Figure 18 is a plan view and Figure 19 is an edge view of a modified form of buoyant valvular element, Figure 20 is a top plan view, Figure 21 is an edge view and Figure 22 is a bottom plan view of the valve seat forming element, Figures 23 to 30 both inclusive are top plan views of modified forms of the combined coupling, holding and spout element, Figures 31 to 38 both inclusive are side elevations respectively of the structures shown in Figures 23 to 30 both inclusive, Figures 39, 40 and 41 are further modified forms of the combined coupling, holding and spout element.

The attachment includes a hollow, combined coupling, holding and spout element or member of sleeve-like form generally indicated at 1. The inner face of the element 1 is of circular form at any transverse sectional point thereof. The element 1 consists of a body part 2 formed of any suitable impervious material, preferably porcelain, but it is to be understood that body part 2 may be constructed of any desirable material. The inner face of body part 2 is formed of portions 3, 4, 5, 6, 7, 8, 9, and 10. The outer face of body part 2 is formed of portions 11, 12, 13, 14 and 15.

With respect to the inner face of body part 2 the portion 3 is of greater length than the portions 4, 5, 6 and 7. The portion 3 is of uniform diameter and of less diameter than the portions 4, 5, 6, 7, 9 and 10. The portion 4 merges into the portion 3 and into the portion 5. The portion 4 gradually increases in diameter from portion 3 to portion 5. The portion 4 is of less length than the portion 5. The latter is of uniform diameter and of greater length than the portion 4. The portion 6 is inversely flared and merges into the portion 5, but is of less length than portion 5. The portion 7 is of uniform diameter and merges into the portion 6. The portion 7 is of less length than portion 5. The portions 6 and 7 constitute shoulders. The shoulder provided by the portion 6 is inversely flared. The shoulder provided by the portion 8 is at the junction of the portions 7 and 9 and extends laterally from the inner end of portion 7. The portion 9 is of greater diameter than the other portions of the inner face of the body part 2 with the exception of the portion 10. The portion 9 is of uniform diameter throughout. The portion 10 is threaded as at 16 and is provided with a pair of diametrically opposed grooves 17, 18 which intersect the threads 16. That part of the element 1 having the inner face portion 3 constitutes a spout 19.

With respect to the outer face of the body part 2, the portion 12 is inversely flared, the portion 13 merges into the portion 12 and gradually increases in diameter to its point of mergence with the portion 14. The latter is disposed outwardly with respect to the inner end of the portion 13 and is of curved contour. The portion 15 is of uniform diameter and is of less length than the portion 13. The latter is of greater length than any of the portions of the outer face of body part 2. The portion 12 of the body part 2 merges at its outer end into the inner end of the portion 11. The latter gradually increases in diameter towards its free end.

With reference to Figure 1, the breast of the body part of a bottle is indicated at 20 and has extended therefrom a neck 21 formed with a peripheral annular shoulder 22 and peripheral threads 23. The portion 10 of the inner face of the element 1 constitutes a coupling means for the purpose of connecting the element to the neck of the bottle. The inner face of portion 10 threadably engages with the threads of the neck. Prior to the engagement of the element 1 with the neck of the bottle, the threads on the bottle neck are provided with cement whereby when the element 1 is connected to the bottle, the connection is not only had by the coacting threads but further by the cement. Furthermore, the using of the cement provides a seal-tight connection between the attachment and the bottle neck and under such conditions the attachment cannot be removed from the bottle neck unless the bottle neck is broken off or the attachment broken.

There is associated with the element 1 a combined housing and fluid conducting element 24 which is positioned in element 1 and may or may not be partly or completely integral with element 1. Preferably, the element 24 will not be formed integral with element 1. The element 24 is constructed from any suitable material, preferably of a material similar to that from which element 1 is constructed. The element 24 is hollow, closed at its top and open at its sides and rear. The element 24 comprises a forward part 25, an intermediate part 26 and a rear or inner part 26. The part 25 includes a lower portion 28 of substantially rectangular contour formed with oppositely curved end edges 29, 30, a flat upper face and side edges 31, 32, each formed centrally thereof with an outwardly directed curved projection 33. The part 25 includes an upper portion 35 rectangular in plan and of segmental contour in transverse cross section. The portion 34 is integral with the upper face and spaced from the edges 29, 30, 31, 32 of portion 28. The end edges of the portion 34 form shoulders 35 disposed inwardly from the edges 29, 30 of portion 28. The edges 31, 32 of the portion 28, as well as the edges of the projections 34 are inwardly beveled, as at 36.

The part 25 merges into the outer end of part 26 and the inner end of the latter merges into the outer end of part 27. The edges 31, 32 and projections 34 overhang the outer ends of one pair of opposed sides of the part 26.

The major portions 37 of the outer faces of the said one pair of opposed sides of the part 26 are flat and incline inwardly throughout from the top of part 27 to the bottom of part 28. The face portions 37 increase in width from part 26 to part 25. The remaining portions of the outer faces of the said opposed sides are upon a segment of a circle. The outer faces of the other pair of opposed sides of the part 26 are upon a segment of a circle. The part 27 is of uniform outer diameter. The part 26 is tapered and substantially of oval contour in horizontal section. The element 24 is formed lengthwise thereof with a pair of diametrically aligned slots 38 which extend from a point removed from the outer ends of the flat inclined face portions 37 into and to a point removed from the inner end of the part 27. The slots have inwardly inclined portions disposed in the part 26 and vertical portions arranged in the part 27 and in this connection attention is directed to Figure 4. The slots 38 decrease in width towards part 25 and constitute fluid outlets and air intakes for the container.

The inner face of the part 27 of element 24 is rabbeted to provide an annular shoulder 39 in close proximity to the inner end of said part. The inner face 40 of side 41 of the element 24 has formed integral therewith a set of spaced webs 42, 43 and 44 which extend from the shoulder 39 to a point in proximity to the upper end of the part 26 of element 24. The webs of the set are spaced equi-distant from each other.

The inner face 45 of side 46 of the element 24 has formed integral therewith a set of spaced webs 47, 48 and 49 which extend from the shoulder 39 to a point in proximity to the upper end of the part 26 of element 24. The webs 47, 48, 49 are spaced equi-distant from each other. The webs 42, 43 and 44 are disposed in spaced alignment with respect to the webs 47, 48 and 49 respectively. The webs 42, 44 project inwardly beyond the web 43. The webs 47, 49 project inwardly beyond the web 48. The inner face of the part 25 of element 1 is formed to provide a seat 50 for a globular weighting member to be referred to. The webs 42, 43 and 44 coact to form conducting-off passages as indicated at 51. The webs 47, 48 and 49 coact to provide conducting-off passages 52. The webs 42 and 44 coact with the inner face of element 24 to provide conducting-off passages 53. The webs 47, 49 coact with the inner face of the element 24 to form conducting-off passages 54. The web 42 coacts with the web 47 and the web 44 coacts with the web 49 to form conducting-off passages 55, 56 which also function as guide passages for valvular elements to be referred to. The web 42 coacts with the web 47 and the web 44 coacts with the web 49 to provide what may be termed arrestors to prevent the revolving of the valve elements to be referred to.

When the element 24 is positioned within the element 1, the ends of the flat upper face of the part 25 abut the shoulder lower portion provided by the portion 8 of the inner face of element 1. The parts 26 and 27 of the element 24 oppose the portion 9 of the inner face of the element 1, but with the inclined portions 37 of element 24 being extended from the portion 9 of the inner face of element 1 thereby providing a pair of oppositely extending channels 57, 58 each being common to intake and discharge. The channels 57, 58 open into an air and contents receiving space 59 provided by the portions 4 and 5 of the inner face of element 1. The space 59 opens into the inner end of the spout. The space 59 is of a size to receive sufficient air whereby when discharge of the contents is had, the flow will be even due to the necessary amount of air supplied to the interior of the bottle or container. The element 24 will be retained in the element 1 in a manner as hereinafter referred to.

The attachment includes a non-buoyant controlling valve and a buoyant controlling valve. The non-buoyant controlling valve may be of the form shown in Figure 10, or the form shown in Figure 13. The buoyant controlling valve may be in the form shown in Figure 16 or in the form shown in Figure 18. The non-buoyant controlling valve shown in Figure 10 is indicated generally at 60 and consists of a circular disc-like body part 61 having a depending circular part 62 of less diameter than the part 61. The part 62 axially thereof is formed with a circular recess 63. Integral with the part 61 is a pair of oppositely extending ears 64 disposed in diametric relation with respect to part 61. The ears 64 are flush with the upper face 65 of part 61. The ears 64 are not flush with the lower face of part 61. The valve 60 is to be arranged in the element 1 and when so arranged has its ears 64 positioned in the passages 55, 56, with one ear arranged between the webs 42, 47 and the other ear between the webs 44, 49.

The buoyant valvular element shown in Figure 16 is indicated at 66 and is formed from any suitable material possessing a buoyant characteristic. The valvular element 66 consists of a circular body part 67 of disc-like form provided with a pair of oppositely extending ears 68 disposed in diametric relation with respect to the body part 67. Element 66 is to be arranged in element 24 and when so arranged, it is disposed inwardly of element 60 and has its ears 68 extending through passages 55, 56 and with one of its ears arranged between webs 42, 47 and its other ear between the webs 44, 49. The elements 60, 66 bear upon each other and are releasably connected together when in normal position. The valve 66 possesses a characteristic to absorb moisture. When the bottle is filled first, the liquid will dampen the valve 66 and also the valve 60. These valves will releasably stick together. The recess 63 functions to provide an air pocket which also tends to releasably connect the valves together. Under normal conditions when the contents of the container are being discharged, the valves 60, 66 bodily move together in unison as they are releasably connected together in a manner as aforesaid. Now, if a surreptitious attempt is made to refill the container with liquid after the contents of the latter have been discharged, the liquid will enter the groove provided by the part 62 of valve 60 when the latter is releasably connected to the valve 66, and as the liquid enters the groove, the rush of liquid tends to exert pressure on the valves 60, 66 releasing one from the other and forcing the valve 66 which is the buoyant valve against its valve seat to be referred to and close the container.

The attachment includes a valve seat forming element 69 which is inserted in the element 24 and bears against the shoulder 39. The element 69 is in the form of an annulus indicated at 70 and the annulus has its upper face provided with an annular rib 71 which has its inner face flush with the inner edge of the annulus. The rib 71 constitutes a valve seat for the valve 66. The valve seat forming element 69 is constructed of any suitable material and the rib 71 has its outer diameter slightly less than the diameter of the disc-like part 67 of the valve 66.

Prior to the connecting of the element 1 to the neck of the container, a resilient washer 72 is mounted on the edge 73 at the mouth of the bottle.

With reference to Figures 13, 14 and 15, the non-buoyant valve element is indicated at 74 and it is of the same construction as the element 60 with this exception that the element 74 is not provided with the ears 64.

With reference to Figures 18 and 19, the buoyant valve element illustrated thereby is indicated at 75 and it is of the same construction as the element 66 with this exception that element 75 is not provided with the ears 68.

The attachment includes a weighting element 76 of globular form and is arranged in the element 24 and interposed between the valve 60 and the seat 50. The weighting element 76 normally tends to maintain the valves 60, 66 or 74, 75 in abutting relation and further acts to maintain the valve 66 or 75 against its seat 71. The element 76 is freely movable within element 24. The weighting element can be constructed of any suitable material.

With reference to Figure 4 the container is illustrated as being in a position for discharge of the contents from the container. The discharge from a container may only be had when the container is disposed at an obtuse angle.

With reference to Figure 4, the arrows 77 indicate the discharge of the contents and the arrows 78 indicate the intake of the air. When the container is in the position shown in Figure 4, the valves move in unison from the seat 71 and carry the weighting element 76 therewith. As the valves and weighting element move in an outward direction with respect to element 24, the weighting element will eventually abut seat 50 and arrest any further outward shift of the valves, such as is shown in Figure 4. When the parts of the attachment are as shown in Figure 4, free and even discharge is had for the contents of the container. The contents are discharged from element 24 through one of the slots 38, while the other slot 38 is provided for the intake of air. As shown in Figure 4, discharge of the contents of the container is through channel 58 whereby the intake of air is had through channel 57.

The hollow combined coupling, holding and spout element of sleeve-like form is set up with what may be termed an outer part, an intermediate part and an inner part as indicated at A, B, and C respectively. The outer part is of less diameter than the intermediate part and the latter is of less diameter than the inner part. In Figure 1 each of the said parts is of circular contour exteriorly. It is to be understood that such element can have its intermediate part of a different outer peripheral contour other than circular and in this connection, attention is directed to Figures 23 to 38 both inclusive. With reference to Figures 23 and 31, the intermediate part B thereof has its outer periphery of a hexagonal contour; to Figures 24 and 32 the intermediate part B has its outer periphery of octagonal contour; to Figures 25 and 33 the intermediate part B has its outer periphery square; to Figures 26 and 34 the outer periphery of the intermediate part B is of diamond contour in cross section; to Figures 27 and 35 the intermediate part B has its outer periphery of fluted contour; to Figures 28 and 36 the intermediate part B has its outer periphery of corrugated contour in cross section; to Figures 29 and 37 the intermediate part B has its outer periphery of star shape in cross section; and to Figures 30 and 38 the intermediate part B is oval contour on cross section.

Preferably the spout of the combined coupling, holding and spout element will be closed by a cork indicated at 79 and shown in Figure 1, but it is to be understood that the spout or outer part A of such element may be closed by other suitable means such as a cap member of any suitable form. The spout or outer part being so formed to receive the cap or have means coacting with means on the cap for detachably securing the cap in position. In this connection, attention is directed to Figures 39, 40 and 41 where the spouts thereof are indicated at 80, 81 and 82. The spout 80 is of the peripherally ribbed or beaded type and the rib or bead thereon is indicated at 83. The cap 81 is of the type to have its outer periphery formed with an annular groove 84 and the spout 82 is peripherally threaded as at 85.

What I claim is:

1. In a non-refillable attachment for containers and of that type including a combined coupling, holding and spout member of sleeve-like form adapted to be connected at its inner end to the outlet of the container, the combination of a combined valve housing, an intake and fluid conducting off element closed at its outer end, open at its inner end and adapted to be positioned within, to open into and to have said end thereof abut aligned parts of the inner face of said member, said element being formed of a solid outer part of substantially rectangular contour, an annular inner part of uniform inner and outer diameters and a hollow intermediate part, said intermediate part having one pair of the opposed sides thereof formed with flat outer surfaces disposed at opposite inward inclinations from said inner part to said outer part, said element being provided lengthwise thereof diametrically opposed slots positioned in said inclined surfaces and inner part and extending from a point removed from said outer part to a point removed from the inner end of said inner part, a pair of oppositely disposed spaced sets of spaced webs integral with and lengthwise of aligned portions of the inner face of said element, said inner part having its inner face rabbetted rearwardly of said ribs, an annular sealing gasket for seating on the outlet of the container and against the inner end of said element, an annular valve seat forming member extending into said rabbet and seating on said gasket, an inner valve coacting with said valve seat for closing said element to the container, said valve being arranged between the inner webs of said sets and slidably confined by the outer webs of said sets, an outer valve for seating on the inner valve arranged between the inner webs of said sets and slidably confined by the outer webs of the sets, and a weighting means for seating on said outer valve arranged between the inner webs of said sets and slidably confined by the outer webs of the sets.

2. The invention as set forth in claim 1 having said inner valve possessing a buoyant characteristic, and said outer valve being non-buoyant.

3. The invention as set forth in claim 1 having said inner valve formed with a pair of laterally extending oppositely disposed ears arranged between the outer webs of the said sets, and said outer valve with a pair of laterally extending oppositely disposed ears arranged between the outer webs of said sets of a length to extend into said slots when said element is tilted.

4. In a non-refillable attachment for containers, a combined valve housing, air intake and fluid conducting off element closed at its outer end and adapted for connection to and for communication with the container, said element being formed with a solid outer part of substantially rectangular contour, having inwardly beveled lengthwise edges formed centrally thereof with beveled projections, an annular inner part of uniform inner and outer diameters and a hollow tapered intermediate part decreasing in inner diameter towards said outer part, the said intermediate part having one pair of the opposed sides thereof formed with flat outer surfaces disposed at opposite inward inclinations from said inner part to said outer part, said element being formed lengthwise thereof with diametrically opposed slots on said inclined surfaces and inner part and extending from a point removed from said outer part to a point removed from the inner end of said inner part, said element being provided lengthwise of aligned portions of its inner face with a pair of oppositely disposed spaced sets of spaced parallel webs, the outer webs of the sets projecting inwardly beyond the inner webs of the sets, and said element being provided on its inner face with a rabbet at the inner ends of said webs.

5. In a non-refillable attachment for containers, a combined valve housing, air intake and fluid conducting off element closed at its outer end and adapted for connection to and for communication with the container, said element being formed with a solid outer part of substantially rectangular contour, having inwardly beveled lengthwise edges formed centrally thereof with beveled projections, an annular inner part of uniform inner and outer diameters and a hollow tapered intermediate part decreasing in inner diameter towards said outer part, the said intermediate part having one pair of the opposed sides thereof formed with flat outer surfaces disposed at opposite inward inclinations from said inner part to said outer part, said element being formed lengthwise thereof with diametrically opposed slots on said inclined surfaces and inner part and extending from a point removed from said outer part to a point removed from the inner end of said inner part, said element being provided lengthwise of aligned portions of its inner face with a pair of oppositely disposed spaced sets of spaced parallel webs, the outer webs of the sets projecting inwardly beyond the inner webs of the sets, and said element being provided on its inner face with a rabbet at the inner ends of said webs, each of said slots having an outer inwardly inclined portion and a vertical inner portion.

6. In a non-refillable attachment for containers, a combined valve housing, air intake and fluid conducting off element closed at its outer end and adapted for connection to and for communication with the container, said element being formed with a solid outer part of substantially rectangular contour, having inwardly beveled lengthwise edges formed centrally thereof with beveled projections, an annular inner part of uniform inner and outer diameters and a hollow tapered intermediate part decreasing in inner diameter towards said outer part, the said intermediate part having one pair of the opposed sides thereof formed with flat outer surfaces disposed at opposite inward inclinations from said inner part to said outer part, said element being formed lengthwise thereof with diametrically opposed slots on said inclined surfaces and inner part and extending from a point removed from said outer part to a point removed from the inner end of said inner part, said element being provided lengthwise of aligned portions of its inner face with a pair of oppositely disposed spaced sets of spaced parallel webs, the outer webs of the sets projecting inwardly beyond the inner webs of the sets, and said element being provided on its inner face with a rabbet at the inner ends of said webs, said webs being arranged on portions of said element disposed at right angles to the portions of the element in which the slots are formed.

7. In a non-refillable attachment for containers, a combined valve housing, air intake and fluid conducting off element for connection to the outlet of the container, said element being closed at its outer end and open at its inner end, said element being formed of a solid substantially rectangular outer part having oppositely disposed curved end edges and inwardly beveled side edges formed intermediate their ends with inwardly beveled projections, an annular inner part of uniform outer diameter and a tapered intermediate part substantially of oval contour in horizontal section extending from said inner part and merging into the outer part at the bottoms of the side edges of the latter and being flush with said end edges, said element being formed lengthwise thereof with a pair of diametrically opposed slots arranged in a portion of one pair of opposed sides of said intermediate and inner parts, and said element being formed lengthwise of said inner face formed with diametrically opposed spaced sets of spaced webs arranged at right angles to said slots, said outer part having its length corresponding to and its width less than the diameter of said inner part and being formed on its outer face in proximity to its ends with shoulders.

JACOB W. SCHIEBER.